(12) United States Patent
Buzdum

(10) Patent No.: US 9,156,623 B1
(45) Date of Patent: Oct. 13, 2015

(54) AUTOMATED TIE PLATE PLACEMENT SYSTEM

(71) Applicant: Mirko Buzdum, Watertown, WI (US)

(72) Inventor: Mirko Buzdum, Watertown, WI (US)

( * ) Notice: Subject to any disclaimer, the term of this patent is extended or adjusted under 35 U.S.C. 154(b) by 0 days.

(21) Appl. No.: 14/288,416

(22) Filed: May 28, 2014

(51) Int. Cl.
  *B65G 25/00* (2006.01)
  *B65G 27/04* (2006.01)
  *E01B 29/32* (2006.01)

(52) U.S. Cl.
  CPC ............... *B65G 27/04* (2013.01); *E01B 29/32* (2013.01)

(58) Field of Classification Search
  CPC ...................................................... B65G 27/07
  USPC ............. 198/409, 396, 443, 448, 771, 752.1, 198/576, 394, 395
  See application file for complete search history.

(56) References Cited

U.S. PATENT DOCUMENTS

| | | | | |
|---|---|---|---|---|
| 4,280,613 A * | 7/1981 | Stewart | ......................... | 198/406 |
| 4,727,989 A * | 3/1988 | Cotic et al. | .................... | 209/546 |
| 4,974,518 A * | 12/1990 | Cotic et al. | ...................... | 104/16 |
| 6,460,680 B1 * | 10/2002 | Hufford | ........................ | 198/367 |
| 8,042,473 B2 * | 10/2011 | Buckley et al. | .................. | 104/16 |
| 8,082,852 B2 * | 12/2011 | Plyler et al. | ..................... | 104/16 |
| 8,985,305 B2 * | 3/2015 | Wong et al. | ................... | 198/383 |

\* cited by examiner

*Primary Examiner* — William R Harp
(74) *Attorney, Agent, or Firm* — Donald J. Ersler

(57) ABSTRACT

An automated tie plate placement system preferably includes a vibratory feeder, at least one vertical translation guide, at least one knock down device, at least one rotary orientation device, at least one bottom orientation device and a programmable logic controller. The vibratory feeder is preferably mounted to a support frame of a hi-rail vehicle. The plurality of tie plates in the vibratory feeder are vibrated into the at least one vertical translation guide. A vertical guide extends past a vertical exit of the vertical translation guide. The knock down device is positioned above the vertical guide. The rotary orientation device rotates the tie plate to place a field end in front. An entrance of the bottom vertical guide may be located adjacent to the rotary orientation device. The programmable logic controller receives inputs from a plurality of sensors and actuates a motor and a plurality of actuators.

20 Claims, 6 Drawing Sheets

AUTOMATED TIE PLATE PLACEMENT SYSTEM

BACKGROUND OF THE INVENTION

1. Field of the Invention

The present invention relates generally to railroads and more specifically to an automated tie plate placement system, which allows a plurality of tie plates to be oriented and placed, adjacent to a plurality of railroad ties.

2. Discussion of the Prior Art

When railroad rails are replaced, tie plates are also replaced. Further, tie plates are also replaced when railroad ties are replaced. The tie plates are located between the railroad rails and the railroad ties. The tie plates distribute force from the railroad rails to the railroad ties; provide orientation; and establish a proper inward cant angle. The tie plates must be precisely placed, before installation on the railroad ties. Presently, the tie plates are manually oriented, before they are placed adjacent to the railroad ties. Tie plates weigh between 30-40 pounds. Currently, the tie plates are sorted by hand. Unfortunately, mishandling of the tie plates can result in injury to the fingers and hands of a worker.

Accordingly, there is a clearly felt need in the art for an automated tie plate placement system, which automatically orients a plurality of tie plates and places them adjacent to railroad ties.

SUMMARY OF THE INVENTION

The present invention provides an automated tie plate placement system, which allows a plurality of tie plates to be oriented and placed, adjacent to a plurality of railroad ties. Each tie plate includes a length, a width, a top, a bottom, a gage end and a field end. The automated tie plate placement system preferably includes a vibratory feeder, at least one vertical translation guide, at least one knock down device, at least one rotary orientation device, at least one bottom orientation device and a programmable logic controller. The vibratory feeder is preferably mounted to a support frame of a hi-rail vehicle. A tie plate guide skirt is supported above the vibratory feeder. A tie plate storage hopper is located adjacent to the tie plate guide skirt. The tie plate storage hopper may have any suitable shape to retain a plurality of tie plates. A magnetic crane is used to transfer a plurality of tie plates from the tie plate storage hopper to the tie plate guide skirt. The tie plate guide skirt includes a tubular body and at least two cross rods. The tubular body includes a tapered entrance. The at least two cross rods are retained in an inner perimeter of the tubular body. The at least two cross rods separate tie plates that are clinging to each other.

The vibratory feeder includes a tie plate vibratory container, a platform, a feeder support frame, a vibration motor and a plurality of suspension devices. The platform is attached to a vehicle support frame of the hi-rail vehicle. The feeder support frame is attached to a top of the platform. The vibration motor is attached to the feeder support frame. The tie plate vibratory container is mounted to the support frame with the plurality of suspension devices. The plurality of tie plates are placed into the tie plate vibratory container through the tie plate guide skirt. The plurality of tie plates eventually take a substantially horizontal orientation, after being vibrated in the tie plate vibratory container. The plurality of tie plates in the tie plate vibratory container are vibrated into the at least one vertical translation guide by the rotation of the vibration motor. The vibration motor includes an eccentric weight mounted to a drive shaft thereof.

The at least one vertical translation guide extends from one end of the tie plate vibratory container. Each vertical translation guide includes a horizontal entrance and a vertical exit. A pair of opposed angled ramps gradually translate the plurality of tie plates from a horizontal orientation to a vertical orientation. A distance between the opposed angled ramps gradually decreases, until there is only enough distance to allow a thickness of the plurality of tie plate to pass through to the vertical exit. A vertical guide extends past a vertical exit of the vertical translation guide. It is preferable to have an opening through the tie plate vibratory container to remove foreign matter, such as rocks, stakes and other small foreign objects.

The knock down device is positioned above the vertical guide. The knock device causes a lengthwise edge of the tie plate to be in contact with a bottom of the vertical guide, instead of a widthwise edge. The rotary orientation device includes a rotary vertical guide, a servo motor and an orientation sensor. A bottom of the rotary vertical guide is driven by the servo motor. A guide slot of the rotary vertical guide is sized to receive a thickness of the tie plate. The orientation sensor determines whether a gage end or a field end is in front. If the gage end is in front, then the tie plate is rotated 180 degrees, such that the field end is in front.

The bottom orientation device preferably includes a bottom vertical guide, a first guide member, a second guide member, a first actuator, a second actuator and a bottom sensor. An entrance of the bottom vertical guide may be located adjacent to an exit of the rotary orientation device. The first guide member is pivotally retained on a first wall of the bottom vertical guide and the second guide member is pivotally retained on a second wall of the bottom vertical guide. The first actuator is used to pivot the first guide member relative to the bottom vertical guide and the second actuator is used to pivot the second guide member relative to the bottom vertical guide. The bottom sensor will detect a bottom of the tie plate and energize the first and second actuators to place the bottom of the tie plate on a support surface.

If only one vertical translation guide is used, then a conveyor diverter is used to choose between a first rail conveyor and a second rail conveyor. The conveyor diverter is positioned at an exit of the bottom orientation device. The conveyor diverter includes a pivoting lever and a conveyor actuator. One end of the pivoting lever is pivotally retained by at a division between the first conveyor and the second conveyor. An opposing end of the pivoting lever is pivoted to guide a tie plate on to the first conveyor or the second conveyor. The tie plate is transferred from an end of the first conveyor to a first placement conveyor with a first push-off actuator. The tie plate is transferred from an end of the second conveyor to a second placement conveyor with a second push-off actuator. The first and second push-off actuators are controlled by first and second optical sensors positioned above the first and second push-off actuators. The programmable logic controller receives inputs from the plurality of sensors and actuates the servo motor and the plurality of actuators.

Accordingly, it is an object of the present invention to provide an automated tie plate placement system, which automatically orients a plurality of tie plates and places them adjacent to railroad ties.

These and additional objects, advantages, features and benefits of the present invention will become apparent from the following specification.

BRIEF DESCRIPTION OF THE DRAWINGS

FIG. 3a is an enlarged side view of a tie plate with a widthwise edge contacting a conveyor, before being knocked-down by a knock down device of an automated tie plate placement system in accordance with the present invention.

DETAILED DESCRIPTION OF THE PREFERRED EMBODIMENTS

Figure 1:
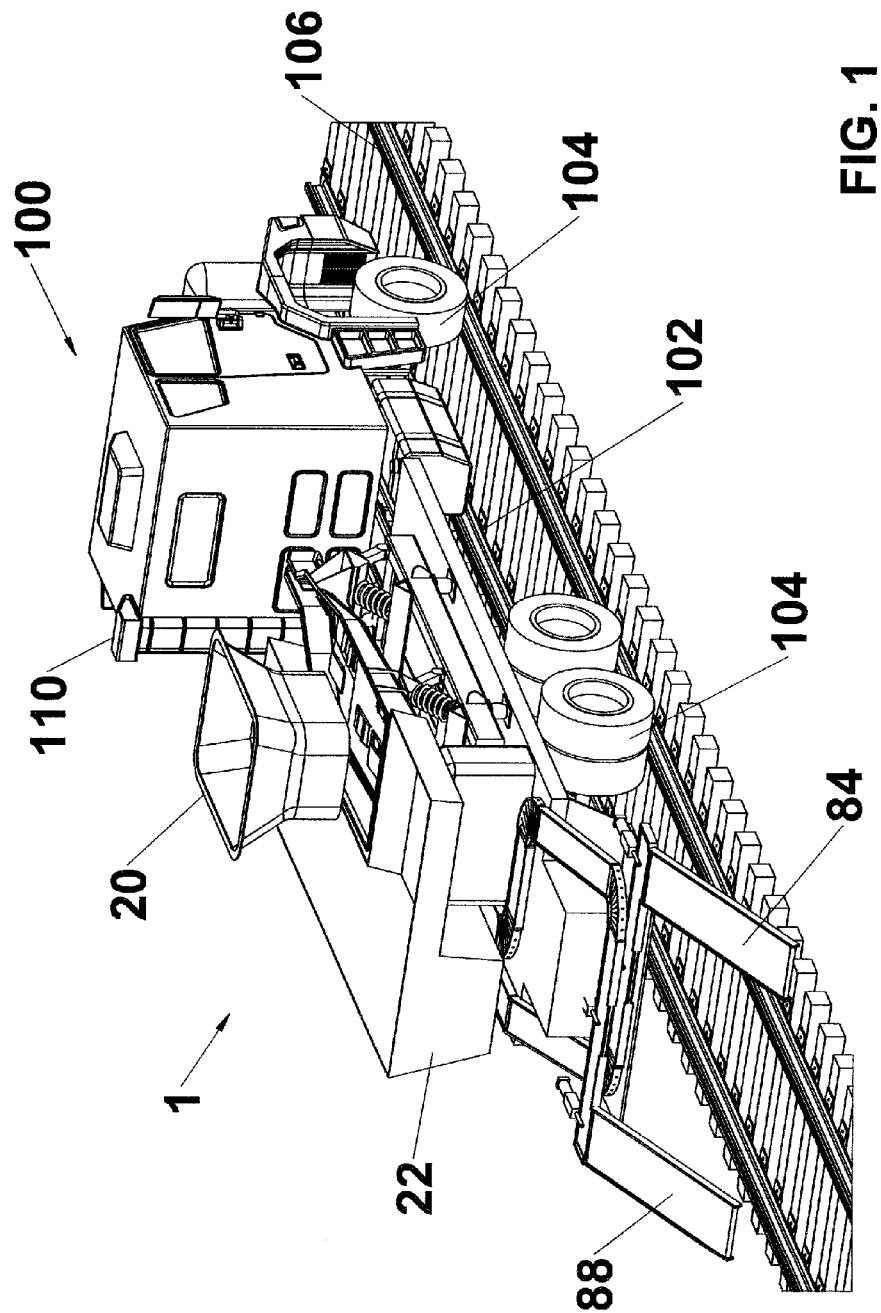
FIG. 1 is a perspective view of an automated tie plate placement system with a tie plate guide skirt and a tie plate storage hopper retained on a high rail vehicle in accordance with the present invention.
Figure 2:
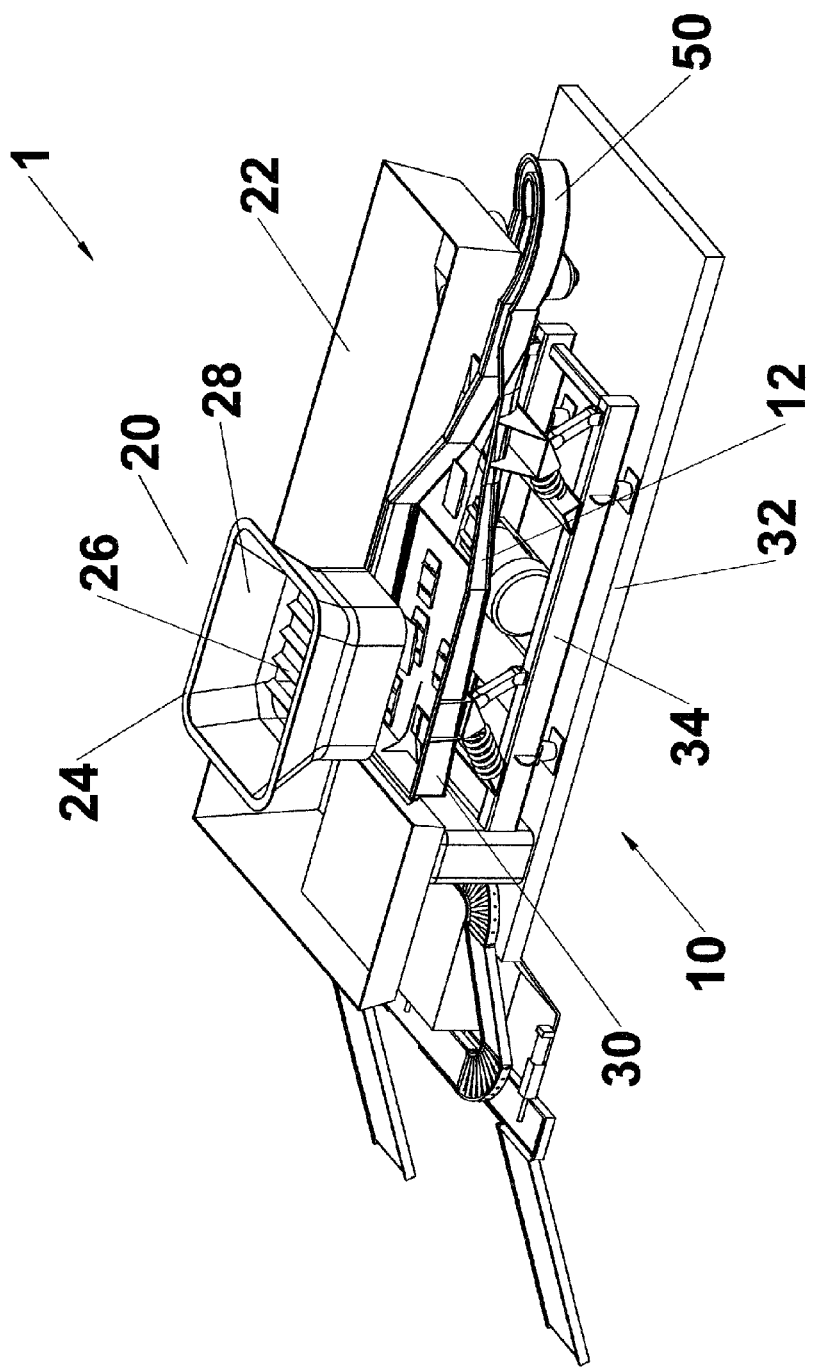
FIG. 2 is a perspective view of an automated tie plate placement system with a tie plate guide skirt and a tie plate storage hopper in accordance with the present invention.

With reference now to the drawings, and particularly to FIG. 1, there is shown a perspective view of an automated tie plate placement system 1 retained on a support frame 102 of a hi-rail vehicle 100. Tires 104 of the truck 100 are positioned to ride on the railroad rails 106. With reference to FIGS. 2-6, the automated tie plate placement system 1 preferably includes a vibratory feeder 10, at least one vertical translation guide 12, at least one knock down device 14, a electronic control device 15, at least one rotary orientation device 16 and at least one bottom orientation device 18. The vibratory feeder 10 is preferably supplied by Action Vibratory Equipment of Newberg, Oregon, but other suppliers could also be used. A tie plate guide skirt 20 is supported above the vibratory feeder 10 with any suitable framework. A tie plate storage hopper 22 is located adjacent to the tie plate guide skirt 20 and around adjacent the vibratory feeder 10. However, the tie plate storage hopper 22 may have any suitable shape to retain a plurality of tie plates 108. A magnetic crane 110 is used to transfer the plurality of tie plates 108 from the tie plate storage hopper 22 to the tie plate guide skirt 20. The tie plate guide skirt 20 includes a tubular body 24 and at least two cross rods 26. The tubular body 24 includes a tapered entrance 28. The at least two cross rods 26 are retained in an inner perimeter of the tubular body 24. The at least two cross rods 26 separate the plurality of tie plates 108 that are clinging to each other.

Figure 4:
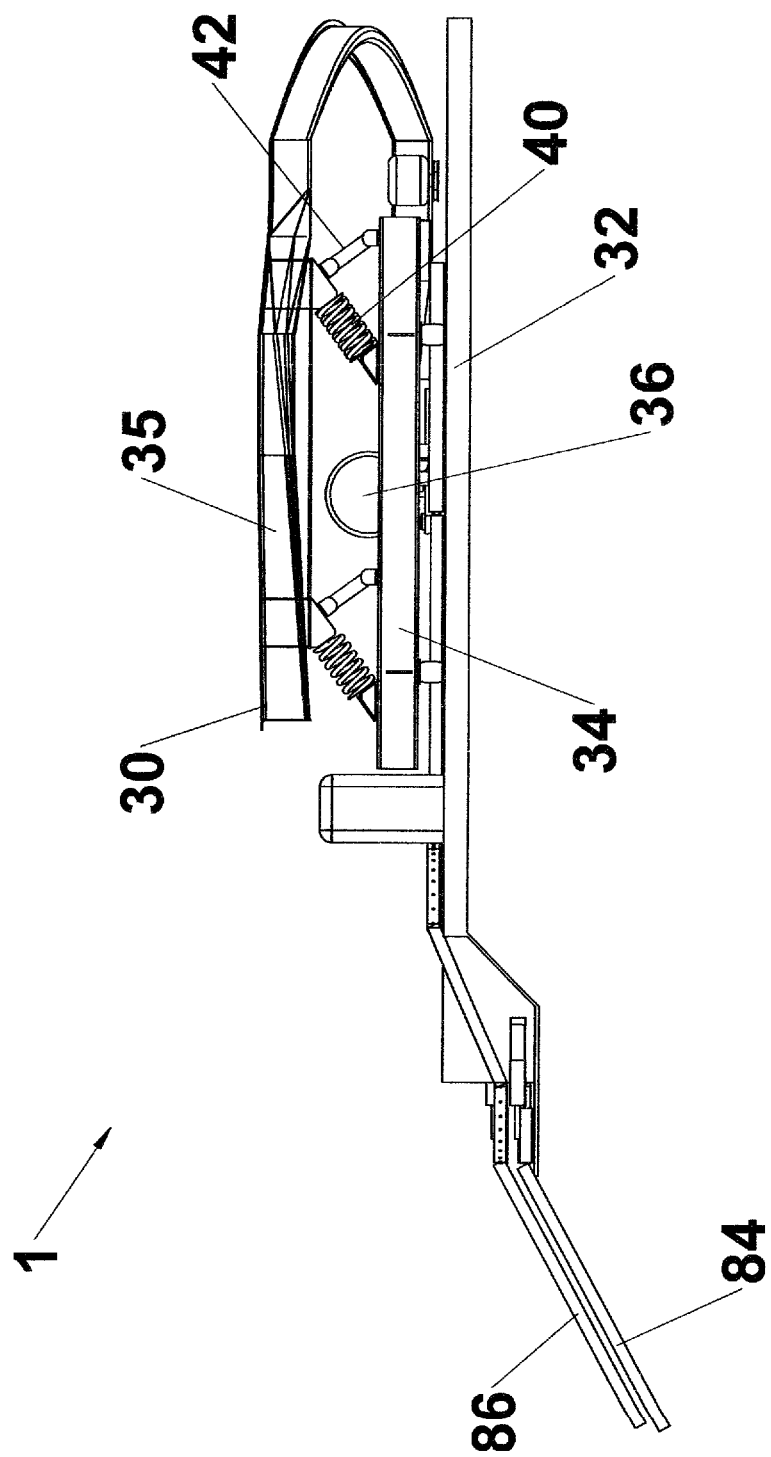
FIG. 4 is a side view of an automated tie plate placement system in accordance with the present invention.
Figure 5:
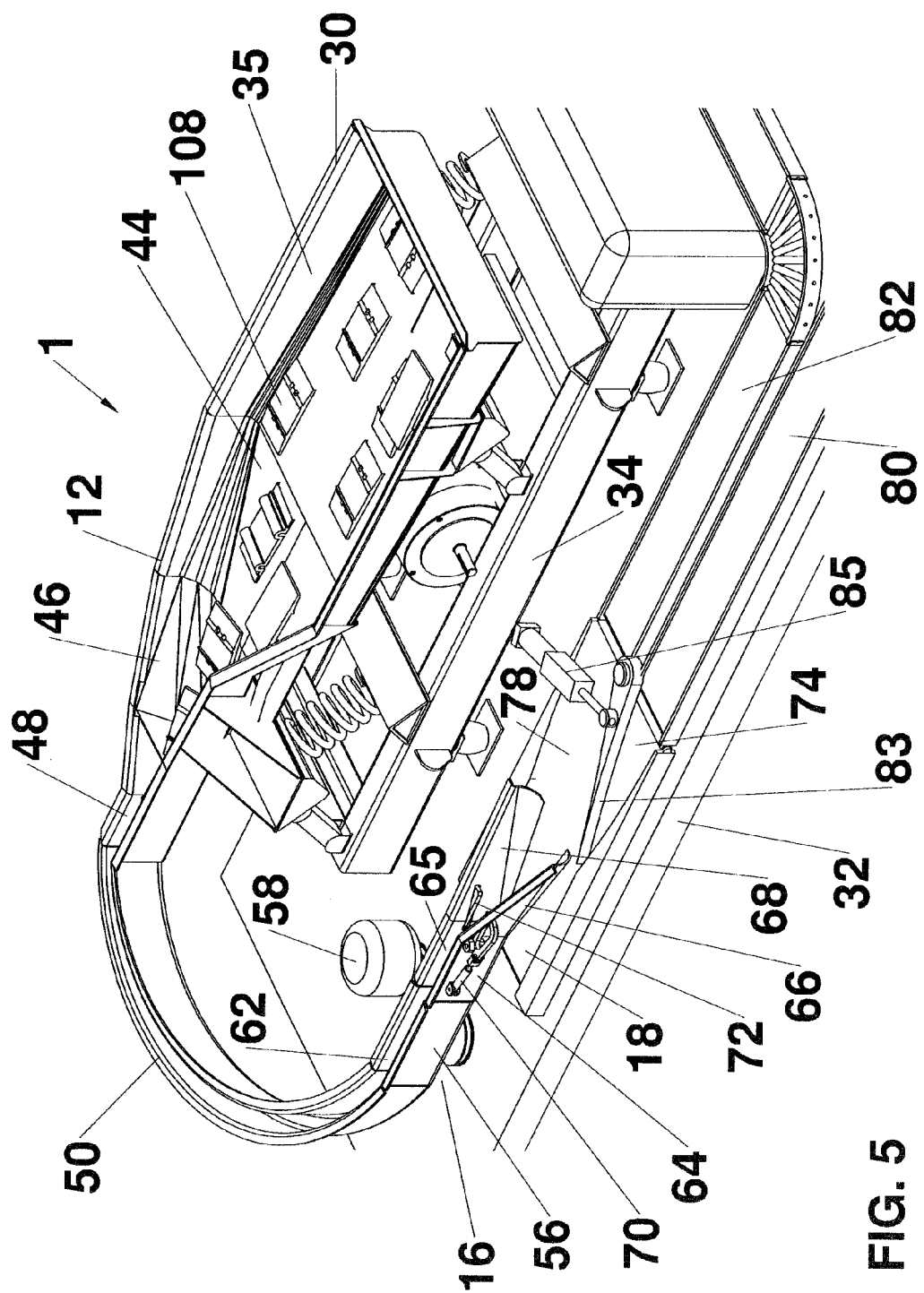
FIG. 5 is an enlarged perspective view of a portion of an automated tie plate placement system in accordance with the present invention.

With reference to FIGS. 4-5, the vibratory feeder 10 includes a tie plate vibratory container 30, a platform 32, a feeder support frame 34, a vibration motor 36 and a plurality of suspension devices. The platform 32 is attached to a top of the support frame 102. The feeder support frame 34 is attached to a top of the platform 32. The vibration motor 36 is attached to the feeder support frame 34. The tie plate vibratory container 30 is mounted to the feeder support frame 34 with the plurality of springs 40 and dampers 42. The tie plate vibratory container 30 includes a peripheral wall 35. The plurality of tie plates 108 fall into the tie plate vibratory container 30, through the tie plate guide skirt 20. The plurality of tie plates 108 eventually take a substantially horizontal orientation, after being vibrated in the tie plate vibratory container 30. The plurality of tie plates 108 in the tie plate vibratory container 30 are vibrated into the at least one vertical translation guide 12 by the rotation of the vibration motor 36. The vibration motor 36 includes an eccentric weight mounted to a drive shaft (not shown) of the vibration motor 36.

The at least one vertical translation guide 12 extends from one end of the tie plate vibratory container 30. Each vertical translation guide 12 includes a horizontal entrance 44, a pair of opposed angled ramps 46 and a vertical exit 48. The pair of opposed angled ramps 46 gradually translate the plurality of tie plates 108 from a horizontal orientation to a vertical orientation. A distance between the opposed angled ramps 46 gradually decreases, until there is only enough distance to allow a thickness of the plurality of tie plate 108 to pass through to the vertical exit 48. A vertical guide 50 extends past the vertical exit 48 of the vertical translation guide 12.

Figure 6:
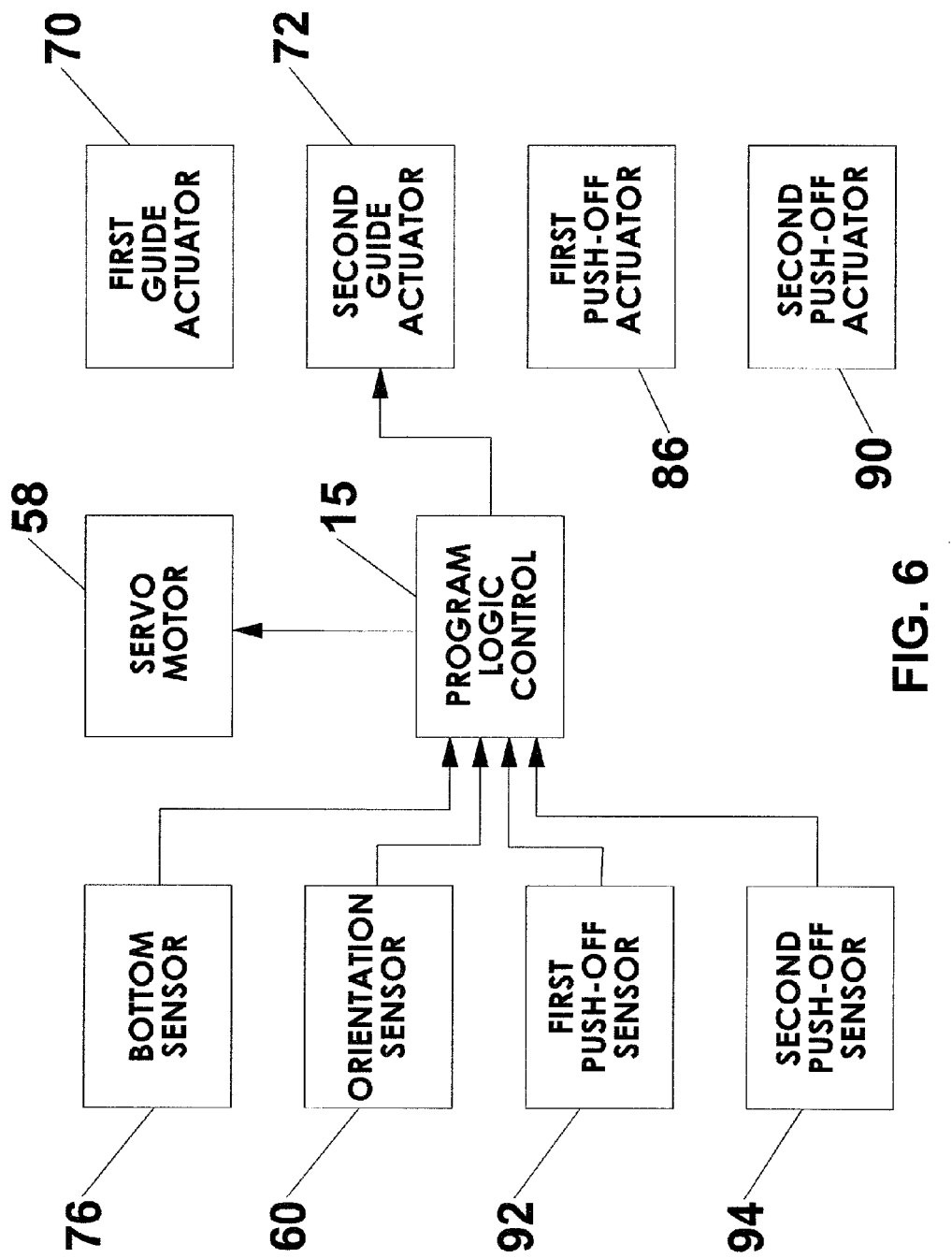
FIG. 6 is a schematic diagram of a programmable controller, a plurality of sensors and a plurality of actuators of an automated tie plate placement system in accordance with the present invention.

With reference to FIG. 3a, the knock down device 14 is positioned above the vertical guide 50 or the vertical exit 48. The knock device 14 preferably includes a plurality of horizontal rollers 52. The plurality horizontal rollers 52 knock down the tie plate 108, such that a lengthwise edge of the tie plate 108 contacts a conveyor 54 of a bottom of the vertical guide 50, instead of a widthwise edge of the tie plate 108. With reference to FIGS. 5-6, the rotary orientation device 16 includes a rotary vertical guide 56, a servo motor 58 and an orientation sensor 60. A bottom of the rotary vertical guide 56 is driven by a drive shaft of the servo motor 58. A guide slot 62 of the rotary vertical guide 56 is sized to receive a thickness of the tie plate 108. The orientation sensor 60 determines whether a gage end or a field end is in front. If the gage end is in front, then the tie plate 108 is rotated 180 degrees, such that the field end is in front. The electronic control device 15 could be a microprocessor based board, a micro controller based board, a programmable logic controller or any other suitable control device.

The bottom orientation device 18 includes a bottom vertical guide 64, a first guide member 66, a second guide member 68, a first guide actuator 70, a second guide actuator 72, a support platform 74 and a bottom sensor 76. An entrance of the bottom vertical guide 64 may be located adjacent to an exit of the rotary orientation device 56. The bottom vertical guide member 64 includes a guide slot 65, which is sized to receive a thickness of the tie plate 108. The first guide member 66 is pivotally retained on a first wall of the bottom vertical guide 64 and the second guide member 68 is pivotally retained on a second wall of the bottom vertical guide 64. The first guide actuator 70 is used to pivot the first guide member 66 relative to the bottom vertical guide 64 and the second guide actuator 72 is used to pivot the second guide member 68 relative to the bottom vertical guide 64. The bottom sensor 76 will detect a bottom of the tie plate 108 and energize the first and second actuators to move in tandem to place the bottom of the tie plate 108 on the support platform 74.

Figure 3:
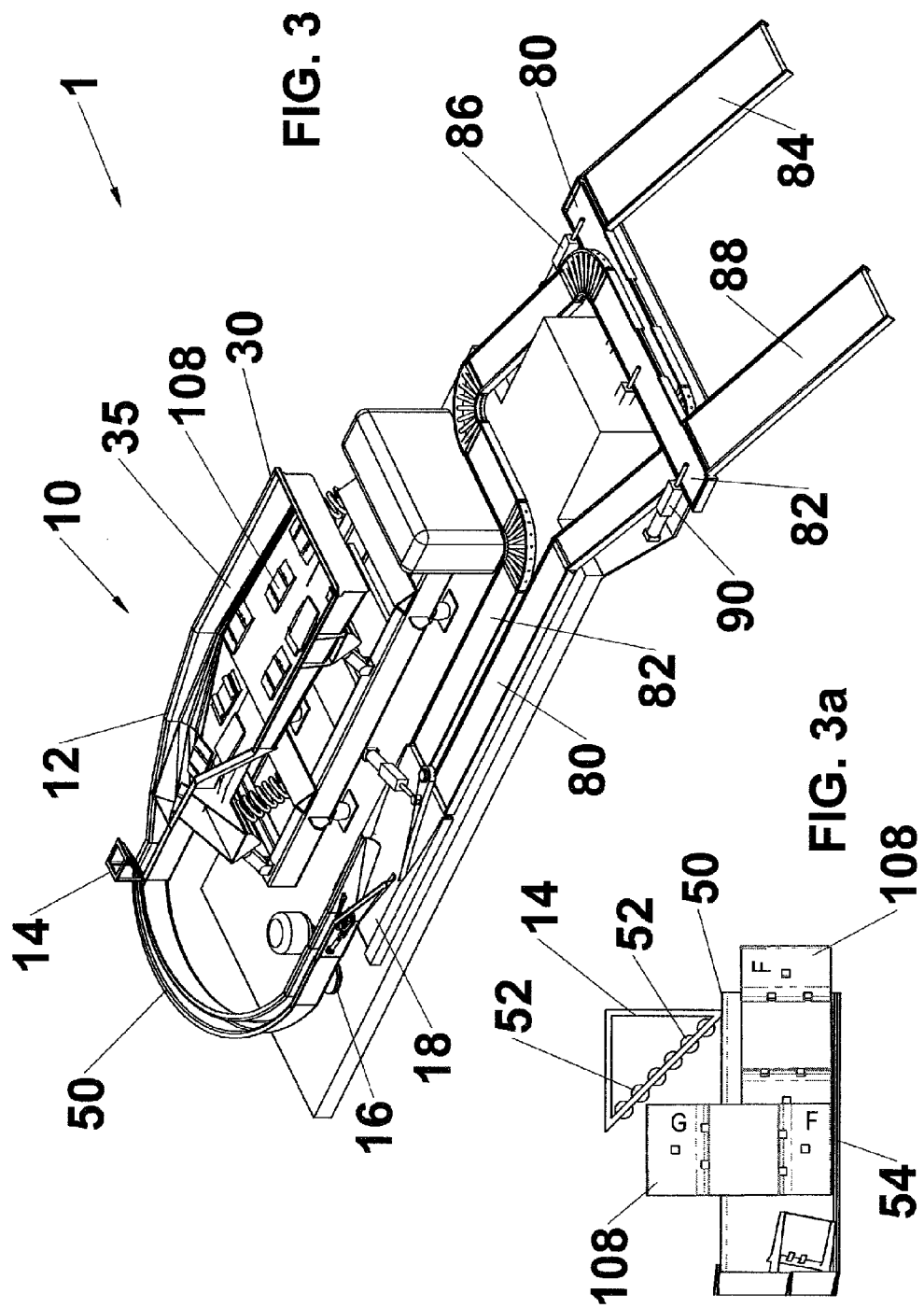
FIG. 3 is a perspective view of an automated tie plate placement system in accordance with the present invention.

If only one vertical translation guide 12 is used, then a conveyor diverter 78 is used to choose between a first rail conveyor 80 and a second rail conveyor 82. However, the automated tie plate placement system 1 may be used for only one rail. The conveyor diverter 78 is positioned at an exit of the support platform 74. The conveyor diverter 78 includes a pivoting lever 83 and a conveyor actuator 85. One end of the pivoting lever 83 is pivotally retained at an end of the support platform 74. An opposing end of the pivoting lever 83 is pivoted to guide a tie plate 108 on to the first conveyor 80 or the second conveyor 82. With reference to FIG. 3, the tie plate 108 is transferred from an end of the first conveyor 80 to a first placement conveyor 84 with a first push-off actuator 86. The tie plate 108 is transferred from an end of the second conveyor 82 to a second placement conveyor 88 with a second push-off actuator 90. The first push-off actuator 86 is controlled by a first optical sensor 92 and the second push-off actuator 90 is controlled by a second optical sensor 94. The electronic control device 15 receives inputs from the sensors 60, 76, 92, 94, and actuates the servo motor 58 and the plurality of actuators 70, 72, 86, 90.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An automated tie plate placement system comprising:
a vibratory feeder for vibrating a plurality of tie plates;
at least one vertical translation guide including a horizontal entrance and a vertical exit, wherein the plurality of tie plates are vibrated into said horizontal entrance, the plurality of tie plates leave said vertical exit in a vertical orientation;
at least one rotary orientation device includes a rotary vertical guide and a rotation device, said rotation device causes said rotary vertical guide to rotate 180 degrees, said rotary vertical guide includes a guide slot for receiving at least one of the plurality of tie plates; and
a bottom orientation device for placing a bottom of the plurality of tie plates on to a support surface.

2. The automated tie plate placement system of claim 1 wherein:
a vibratory feeder includes a tie plate vibratory container, a feeder support frame, a vibration motor and a plurality of suspension devices, said vibration motor is attached to said feeder support frame, said tie plate vibratory container is mounted to said feeder support frame with said plurality of suspension devices.

3. The automated tie plate placement system of claim 1 wherein:
one end of said horizontal entrance extends from an end of said tie plate vibratory container, one end of a pair of opposed angled ramps extend from the other end of said horizontal entrance, said vertical exit extends from the other end of said pair of opposed ramps.

4. The automated tie plate placement system of claim 3 wherein:
said pair of opposed ramps gradually translate the plurality of tie plates from a horizontal orientation to a vertical orientation, a distance between said opposed angled ramps gradually decreases, until there is only enough distance to allow a thickness of the plurality of tie plates to pass through said vertical exit.

5. The automated tie plate placement system of claim 1 wherein:
a bottom orientation device includes a bottom vertical guide, a first guide member, a second guide member, a first actuator and a second actuator, said first guide member is pivotally retained on a first wall of said bottom vertical guide, said second guide member is pivotally retained on a second wall of said bottom vertical guide, said first actuator pivots said first guide member, said second actuator pivots said second guide member.

6. The automated tie plate placement system of claim 1, further comprising:
a tie plate guide skirt is supported above said vibratory feeder.

7. The automated tie plate placement system of claim 6, further comprising:
a tie plate storage hopper is located adjacent said tie plate guide skirt, wherein the plurality of tie plates are placed in said tie plate storage hopper, the plurality of tie plates are transferred from said tie plate storage hopper to said tie plate guide skirt.

8. An automated tie plate placement system comprising:
a vibratory feeder for vibrating a plurality of tie plates;
at least one vertical translation guide including a horizontal entrance and a vertical exit, wherein the plurality of tie plates are vibrated into said horizontal entrance, the plurality of tie plates leave said vertical exit in a vertical orientation;
a knock down guide is positioned adjacent said vertical exit; at least one rotary orientation device includes a rotary vertical guide and a rotation device, said rotation device causes said rotary vertical guide to rotate 180 degrees, said rotary vertical guide includes a guide slot for receiving at least one of the plurality of tie plates; and
a bottom orientation device for placing a bottom of the plurality of tie plates on to a support surface.

9. The automated tie plate placement system of claim 8 wherein:
a vibratory feeder includes a tie plate vibratory container, a feeder support frame, a vibration motor and a plurality of suspension devices, said vibration motor is attached to said feeder support frame, said tie plate vibratory container is mounted to said feeder support frame with said plurality of suspension devices.

10. The automated tie plate placement system of claim 8 wherein:
one end of said horizontal entrance extends from an end of said tie plate vibratory container, one end of a pair of opposed angled ramps extends from the other end of said horizontal entrance, said vertical exit extends from the other end of said pair of opposed ramps.

11. The automated tie plate placement system of claim 10 wherein:
said pair of opposed ramps gradually translate the plurality of tie plates from a horizontal orientation to a vertical orientation, a distance between said opposed angled ramps gradually decreases, until there is only enough distance to allow a thickness of the plurality of tie plates to pass through said vertical exit.

12. The automated tie plate placement system of claim 8 wherein:
a bottom orientation device includes a bottom vertical guide, a first guide member, a second guide member, a first actuator and a second actuator, said first guide member is pivotally retained on a first wall of said bottom vertical guide, said second guide member is pivotally retained on a second wall of said bottom vertical guide, said first actuator pivots said first guide member, said second actuator pivots said second guide member.

13. The automated tie plate placement system of claim 8, further comprising:
a tie plate guide skirt is supported above said vibratory feeder.

14. The automated tie plate placement system of claim 13, further comprising:
a tie plate storage hopper is located adjacent said tie plate guide skirt, wherein the plurality of tie plates are placed in said tie plate storage hopper, the plurality of tie plates are transferred from said tie plate storage hopper to said tie plate guide skirt.

15. An automated tie plate placement system comprising:
a vibratory feeder for vibrating a plurality of tie plates;

at least one vertical translation guide including a horizontal entrance, a pair of opposed angle ramps and a vertical exit, wherein said pair of opposed angled ramps gradually translate the plurality of tie plates from a horizontal orientation to a vertical orientation;

at least one rotary orientation device includes a rotary vertical guide and a rotation device, said rotation device causes said rotary vertical guide to rotate 180 degrees, said rotary vertical guide includes a guide slot for receiving at least one of the plurality of tie plates; and a bottom orientation device for placing a bottom of the plurality of tie plates on to a support surface.

16. The automated tie plate placement system of claim 15 wherein:

a vibratory feeder includes a tie plate vibratory container, a feeder support frame, a vibration motor and a plurality of suspension devices, said vibration motor is attached to said feeder support frame, said tie plate vibratory container is mounted to said feeder support frame with said plurality of suspension devices.

17. The automated tie plate placement system of claim 15 wherein:

one end of said horizontal entrance extends from an end of said tie plate vibratory container, one end of said pair of opposed angled ramps extend from the other end of said horizontal entrance, said vertical exit extends from the other end of said pair of opposed ramps.

18. The automated tie plate placement system of claim 17 wherein:

a distance between said opposed angled ramps gradually decreases, until there is only enough distance to allow a thickness of the plurality of tie plates to pass through said vertical exit.

19. The automated tie plate placement system of claim 15 wherein:

a bottom orientation device includes a bottom vertical guide, a first guide member, a second guide member, a first actuator and a second actuator, said first guide member is pivotally retained on a first wall of said bottom vertical guide, said second guide member is pivotally retained on a second wall of said bottom vertical guide, said first actuator pivots said first guide member, said second actuator pivots said second guide member.

20. The automated tie plate placement system of claim 15, further comprising:

a tie plate guide skirt is supported above said vibratory feeder.

\* \* \* \* \*